(12) United States Patent
Itsumi

(10) Patent No.: US 11,172,166 B2
(45) Date of Patent: Nov. 9, 2021

(54) VIDEO DISTRIBUTION SYSTEM, VIDEO DISTRIBUTION METHOD, AND RECORDING MEDIUM STORING VIDEO DISTRIBUTION PROGRAM

(71) Applicant: NEC Corporation, Tokyo (JP)

(72) Inventor: Hayato Itsumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/756,547

(22) PCT Filed: Oct. 23, 2018

(86) PCT No.: PCT/JP2018/039258
§ 371 (c)(1),
(2) Date: Apr. 16, 2020

(87) PCT Pub. No.: WO2019/082864
PCT Pub. Date: May 2, 2019

(65) Prior Publication Data
US 2020/0296333 A1    Sep. 17, 2020

(30) Foreign Application Priority Data
Oct. 23, 2017    (JP) .............................. JP2017-204459

(51) Int. Cl.
*H04N 7/18*    (2006.01)
*H04N 7/01*    (2006.01)

(52) U.S. Cl.
CPC ........... *H04N 7/181* (2013.01); *H04N 7/0127* (2013.01)

(58) Field of Classification Search
None
See application file for complete search history.

(56) References Cited

U.S. PATENT DOCUMENTS

2005/0018049 A1 *    1/2005    Falk ........................ H04N 5/232
                                                    348/207.99
2007/0217765 A1    9/2007    Itoh et al.
(Continued)

FOREIGN PATENT DOCUMENTS

JP    2005-130041 A    5/2005
JP    2006-238017 A    9/2006
(Continued)

OTHER PUBLICATIONS

International Search Report for PCT Application No. PCT/JP2018/039258, dated Dec. 18, 2018.
(Continued)

*Primary Examiner* — Christopher Braniff
(74) *Attorney, Agent, or Firm* — Sughrue Mion, PLLC

(57) ABSTRACT

This video distribution system includes: an allocation output means for transmitting, at a notified frame rate, videos acquired from a plurality of cameras to analysis devices that process the videos; and a rate determination means for calculating a frame rate such that an objective function value, which increases with an increase of the total sum of the product of the variation amount among the frames of a transmitted video and the transmission frame rate, becomes maximum, under a condition that the total frame rates of the video received by an analysis device does not exceed the analysis processing speed of the analysis device, and for notifying the allocation output means about the calculated frame rate, to distribute, to each of analysis devices, a video having an appropriate frame rate according to the variation amount among frames of the video and the analysis process speed of the analysis device.

8 Claims, 13 Drawing Sheets

(56) References Cited

U.S. PATENT DOCUMENTS

2008/0278582 A1 11/2008 Chung et al.
2012/0194676 A1* 8/2012 Laganiere .......... G06K 9/00711
 348/143
2015/0271493 A1 9/2015 Okazaki

FOREIGN PATENT DOCUMENTS

JP 2007-243699 A 9/2007
WO 2014/061181 A1 4/2014

OTHER PUBLICATIONS

English translation of Written opinion for PCT Application No. PCT/JP2018/039258, dated Dec. 18, 2018.

* cited by examiner

Fig. 5

| IP ADDRESS | IDENTIFICATION NUMBER ($i$) | MAXIMUM FRAME RATE ($MaxRate$) | VARIATION AMOUNT ($\omega c$) |
|---|---|---|---|
| 192.168.0.A | 1 | 15 | 0.8 |
| 192.168.0.B | 2 | 15 | 0.6 |
| 192.168.0.C | 3 | 15 | 0.1 |

N LINES

Fig. 6

| IP ADDRESS | IDENTIFICA-TION NUMBER ($j$) | ANALYSIS PROCESS-ING SPEED ($P$) | BAND OF COMMUNIC ATION NETWORK B ($B_{DP}$) | SET OF IDENTIFICATION NUMBER OF CAMERA BEING ANALYSIS TARGET ($T$) | MINIMUM REQUIRED RATE ($MinRate$) | PRIORITY ($\omega_a$) |
|---|---|---|---|---|---|---|
| 192.168.0.X | 1 | 20 | 25 | 1,2 | 1 | 1 |
| 192.168.0.Y | 2 | 30 | 40 | 1,2,3 | 5 | 2 |
| 192.168.0.Z | 3 | 15 | 12 | 1,3 | 2 | 3 |

{ M LINES

BAND OF COMMUNICATION NETWORK A ($B_{AD}$)

90

OPERATION EXAMPLE 2

VIDEO DISTRIBUTION SYSTEM, VIDEO DISTRIBUTION METHOD, AND RECORDING MEDIUM STORING VIDEO DISTRIBUTION PROGRAM

This application is a National Stage Entry of PCT/JP2018/039258 filed on Oct. 23, 2018, which claims priority from Japanese Patent Application 2017-204459 filed on Oct. 23, 2017 the contents of all of which are incorporated herein by reference, in their entirety.

TECHNICAL FIELD

The present disclosure relates to a video distribution system and the like.

BACKGROUND ART

Improvement of recognition accuracy by deep learning or cloud computing enables a flexible use of processing resources. As a result, a demand for a solution of achieving crime prevention, marketing, operation improvement, and the like by using a video distribution system is increasing in a facility such as a retail store, a stadium, and a shopping mall. It can be cited that, for example, in a retail store, age, sex, and a flow line of a customer in the store are estimated by deep learning from a video captured in the store, which is used for marketing.

In such a system, an analysis device collects, via a communication network, videos from cameras arranged at a plurality of places in a store and the like, and analyzes the collected videos. On the other hand, there is a demand for analyzing a video from one camera by using a plurality of analysis devices. For example, it can be cited that, from a video from a camera near an entrance of a store, one analysis device analyzes age and sex of a customer and, in parallel, another analysis device analyzes a suspicious person. In other words, in such a system, it is necessary to distribute videos acquired from a plurality of cameras to a plurality of analysis devices. Such video distribution may be performed via a communication network.

In relation to the above-described system, techniques of PTLs 1 and 2 are disclosed.

PTL 1 discloses a monitoring control device that transmits image data to be transmitted from a monitoring camera to a plurality of remote monitoring terminals being connected via a communication network. The monitoring control device allocates a high frame rate to a remote monitoring terminal having a high priority within a range of communication network transmission capacity. Further, the monitoring control device increases a frame rate of image data from a monitoring camera having a video in which a motion occurs.

PTL 2 discloses an image accumulation/distribution system that accumulates image data captured by a camera and distributes the image data to a client device. The image accumulation/distribution system performs band control based on importance of a target camera or a target client device.

CITATION LIST

Patent Literature

[PTL 1] Japanese Unexamined Patent Application Publication No. 2006-238017
[PTL 2] Japanese Unexamined Patent Application Publication No. 2005-130041

SUMMARY OF INVENTION

Technical Problem

In order to perform video analysis precisely with limited processing resources, it becomes an issue to satisfy the following two requirements in a well-balanced manner.

A more effective analysis result can be expected from a video having a large variation amount among frames. The video having a large variation amount among frames is, for example, a video in which many customers and passers-by are captured. A first requirement is that the video having a large variation amount among frames is distributed to an analysis device at a high frame rate.

On the other hand, an analysis device that performs an analysis of video data by deep learning requires many processing resources such as arithmetic units and image processing devices. In particular, when a frame rate of a video to be processed is high, a required amount of processing resources becomes large. When the video with a high frame rate is uniformly distributed to each analysis device, the analysis device becomes overloaded, thereby causing a processing delay, and the analysis result may not be provided in a timely manner. In a case of analysis for crime prevention and the like, it is essential that the analysis result is acquired in a timely manner. Therefore, a second requirement is to control an amount of video to be distributed to an analysis device within a range commensurate with the amount of processing resources included in the analysis device.

None of the techniques disclosed in above-described PTLs adjusts a frame rate of a video to be transmitted to each device, depending on a variation amount and a speed of analysis processing by a receiving device, and thus, the techniques do not solve the above-described issues.

An object of the present disclosure is to solve the above-described issues and to provide a video distribution system and the like that are able to distribute, when videos acquired from a plurality of cameras are distributed to a plurality of analysis devices, a video having an appropriate frame rate, depending on a variation amount among frames of the video and a speed of analysis processing by the analysis device.

Solution to Problem

A video distribution system according to one aspect of the present disclosure includes: an allocation output means for transmitting, at a frame rate being notified, videos acquired from a plurality of cameras to a plurality of analysis devices that process the videos; and a rate determination means for calculating the frame rate in such a way that a value of an objective function, which increases with an increase of a sum total of products of variation amounts among frames of the videos being transmitted and the frame rate being transmitted, becomes maximum, under a first condition that a sum total of the frame rates of the videos be received by the analysis devices does not exceed a speed of analysis processing by the analysis devices, and for notifying the allocation output means of the frame rate being calculated.

A video distribution method according to one aspect of the present disclosure includes, 1) when videos acquired from a plurality of cameras are transmitted to a plurality of analysis devices that process the videos, 2) calculating a frame rate in such a way that a value of an objective function, which increases with an increase of a sum total of products of variation amounts among frames of the videos being transmitted and the frame rate being transmitted, becomes maximum, under a first condition that a sum total of the frame rates of the videos received by the analysis devices does not exceed a speed of analysis processing by the analysis devices, and 3) transmitting the videos at the frame rate being calculated.

A video distribution program according to one aspect of the present disclosure causes a computer to execute: processing of transmitting, at a frame rate being notified, videos acquired from a plurality of cameras to a plurality of analysis devices that process the videos; and processing of calculating and notifying the frame rate in such a way that a value of an objective function, which increases with an increase of a sum total of products of variation amounts among frames of the videos being transmitted and the frame rate being transmitted, becomes maximum, under a first condition that a sum total of the frame rates of the videos received by the analysis devices does not exceed a speed of analysis processing by the analysis device.

Advantageous Effects of Invention

The video distribution system according to one aspect of the present disclosure distributes, to each of the plurality of analysis devices, a video having an appropriate frame rate, depending on a variation amount among frames of the video and a speed of analysis processing by the analysis device.

BRIEF DESCRIPTION OF DRAWINGS

FIG. 5 is an example of a data structure stored in a camera information storage unit 32.

FIG. 6 is an example of a data structure stored in an analysis device information storage unit 38.

EXAMPLE EMBODIMENT

First Example Embodiment

<Configuration and Operation of Each Unit>

Figure 1:
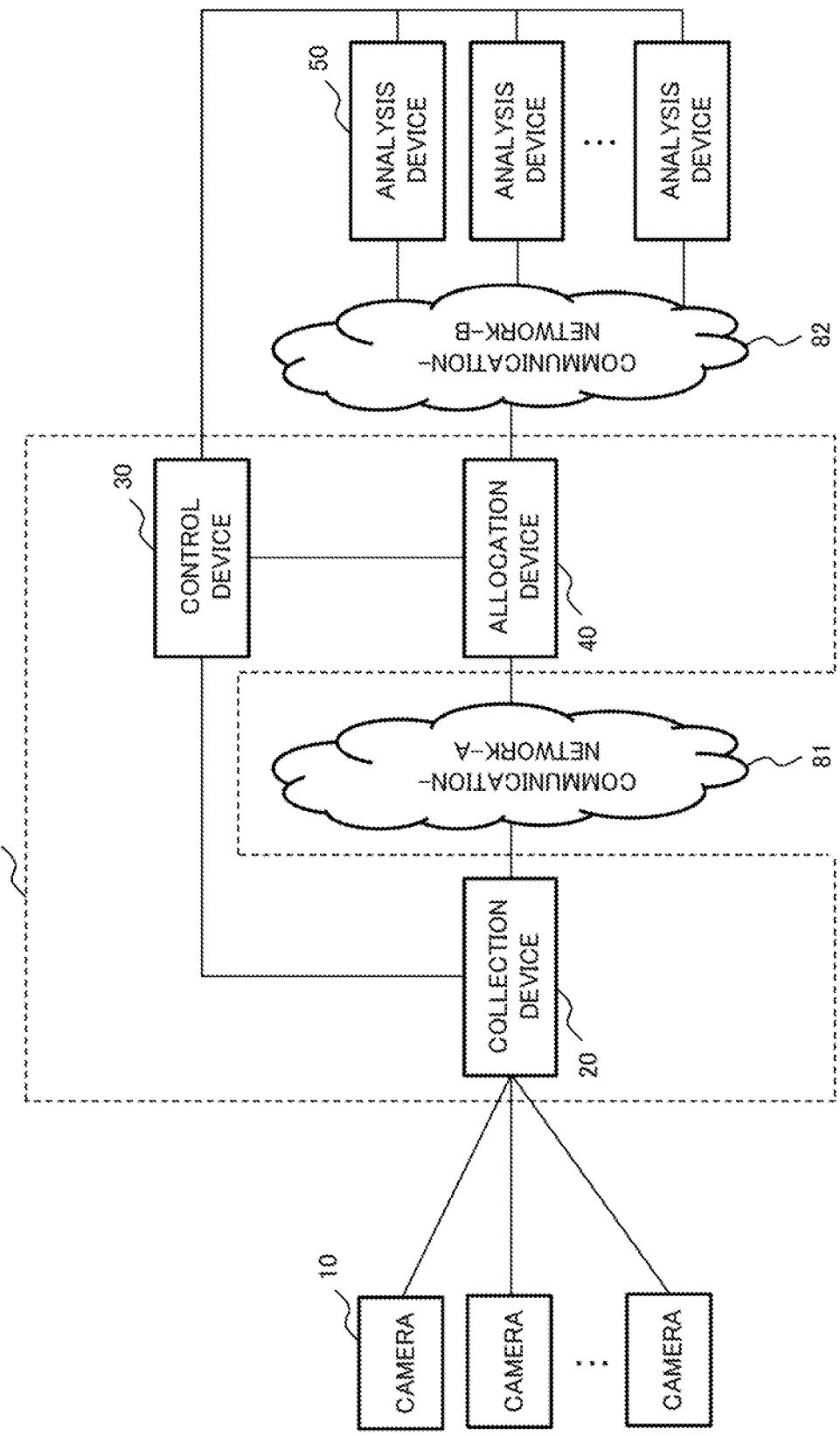
FIG. 1 is a block diagram illustrating a configuration example of a video distribution system 90 according to a first example embodiment.

FIG. 1 is a block diagram illustrating a configuration example of a video distribution system 90 according to a first example embodiment.

The video distribution system 90 includes a collection device 20, a control device 30, and an allocation device 40. The collection device 20 and the allocation device 40 are connected by a communication-network-A 81 for video distribution. The collection device 20 is connected to a plurality of cameras 10, and the allocation device 40 is connected to a plurality of analysis devices 50 by a communication-network-B 82 for video distribution. The collection device 20, the control device 30, and the allocation device 40 are interconnected by a communication network for control.

The plurality of cameras 10 are installed, for example, at various places in a shopping center. The allocation device 40 performs, for example, an analysis of age and sex, and an analysis of a suspicious person of a video captured by the camera 10 designated by an operator or the like of the video distribution system 90.

The collection device 20 transmits video data transmitted from the camera 10 to the allocation device 40 via the communication-network-A 81 at a frame rate to be notified by a control parameter received from the control device 30. The allocation device 40 transmits the video transmitted from the collection device 20 to the designated analysis device 50 via the communication-network-B 82 at a frame rate to be notified by a control parameter received from the control device 30. A plurality of the collection devices 20 and a plurality of the allocation devices 40 may exist in the video distribution system 90.

Figure 2:
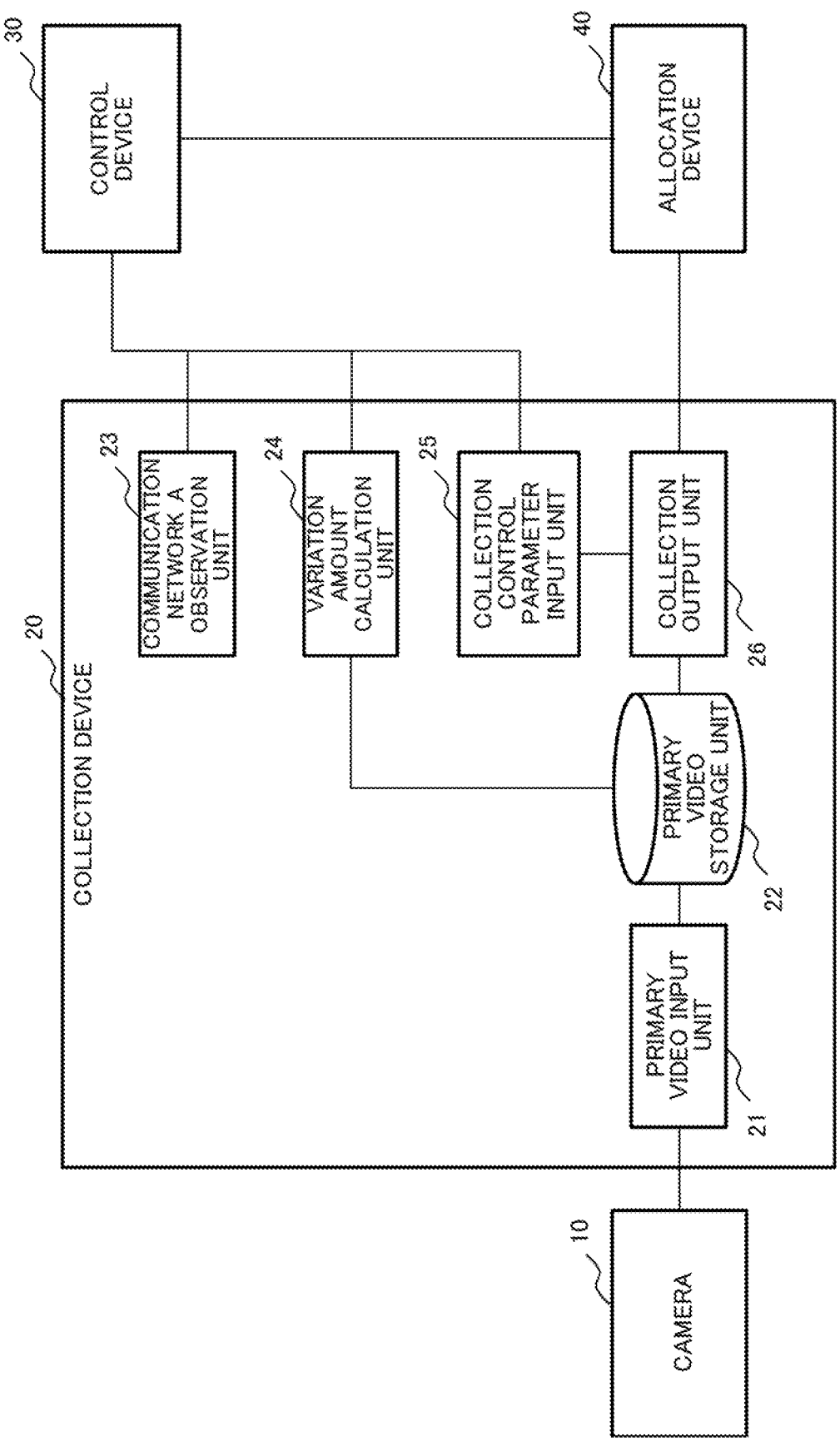
FIG. 2 is a block diagram illustrating a configuration example of a collection device 20.

FIG. 2 is a block diagram illustrating a configuration example of the collection device 20. The collection device 20 includes a primary video input unit 21, a primary video storage unit 22, a communication-network-A observation unit 23, a variation amount calculation unit 24, a collection control parameter input unit 25, and a collection output unit 26. The primary video input unit 21 receives the video data from the camera 10 and stores the received video data in the primary video storage unit 22. The collection control parameter input unit 25 receives, from the control device 30, the control parameter including the frame rate and notifies the collection output unit 26.

The collection output unit 26 transmits the video stored in the primary video storage unit 22 to the allocation device 40 via the communication-network-A 81 at the frame rate notified by the control parameter. At this time, the collection output unit 26 outputs the video with or without excluding some frames, and thus transmits the video at the notified frame rate. For example, when 5 is notified as the frame rate by the control parameter and the original frame rate of the video from the camera 10 stored in the primary video storage unit 22 is 15, the collection output unit 26 transmits one third out of the original frames and does not transmit two thirds of the original frames. In this example, the collection output unit 26 performs a series of operations that transmits one frame, then ignores two frames, and transmits the next one frame.

The communication-network-A observation unit 23 measures a communication band $B_{AD}$ of the communication-network-A 81, and notifies the control device 30 of the measurement result. The variation amount calculation unit 24 calculates a variation amount $\omega_{ci}$ (i is an identification number of each camera 10) among frames of the video captured by each camera 10, and notifies the control device 30 of those values.

The variation amount calculation unit 24 calculates the variation amount from the video of the latest predetermined time segment T, for example, for one minute, in the video from each camera 10 stored in the primary video storage unit 22. For example, the variation amount calculation unit 24 acquires, by using the following Equation 1, a variance within the time segment T with respect to the variation amount between a frame t ($F_t$) and the next frame t+1 ($F_{t+1}$), and outputs the value as a variation amount.

$$\omega_{ci} = \frac{\sum_{t=1}^{I-1}\left\{MSE(F_t, F_{t+1}) - \frac{\sum_{t=1}^{I-1} MSE(F_t, F_{t+1})}{I-1}\right\}^2}{I-1}$$ [Equation 1]

Herein, I (natural number) represents the total number of the frames in the video for the time segment T. MSE indicates a mean squared error, and represents a difference between the frames. Specifically, $MSE(F_t, F_{t+1})$ means the variation amount between the frame t and the next frame t+1.

When the value of the variation amount $\omega_{ci}$ is large, that indicates that the variation amount among the frames for the time segment T of the i-th camera 10 is large. The video distribution system 90 preferentially processes, by using the value, the video from the camera 10 having a large variation amount, and thus enables high-precision analysis.

The variation amount calculation unit 24 calculates, for example, a variance within the time segment T with respect to the number of pixels having a difference in color among frames as the variation amount of the frames. In addition, the variation amount among frames of the video from each camera 10 is not limited to the above, and may be acquired by another method. For example, the variation amount calculation unit 24 may calculate a variance within the time segment T with respect to the number of pixels having equal to or more than a predetermined difference in color among frames as the variation amount of the frames.

The communication-network-A observation unit 23 and the variation amount calculation unit 24 may be activated periodically and transmit data to the control device 30, or may transmit data in response to an instruction from the control device 30.

Figure 3:
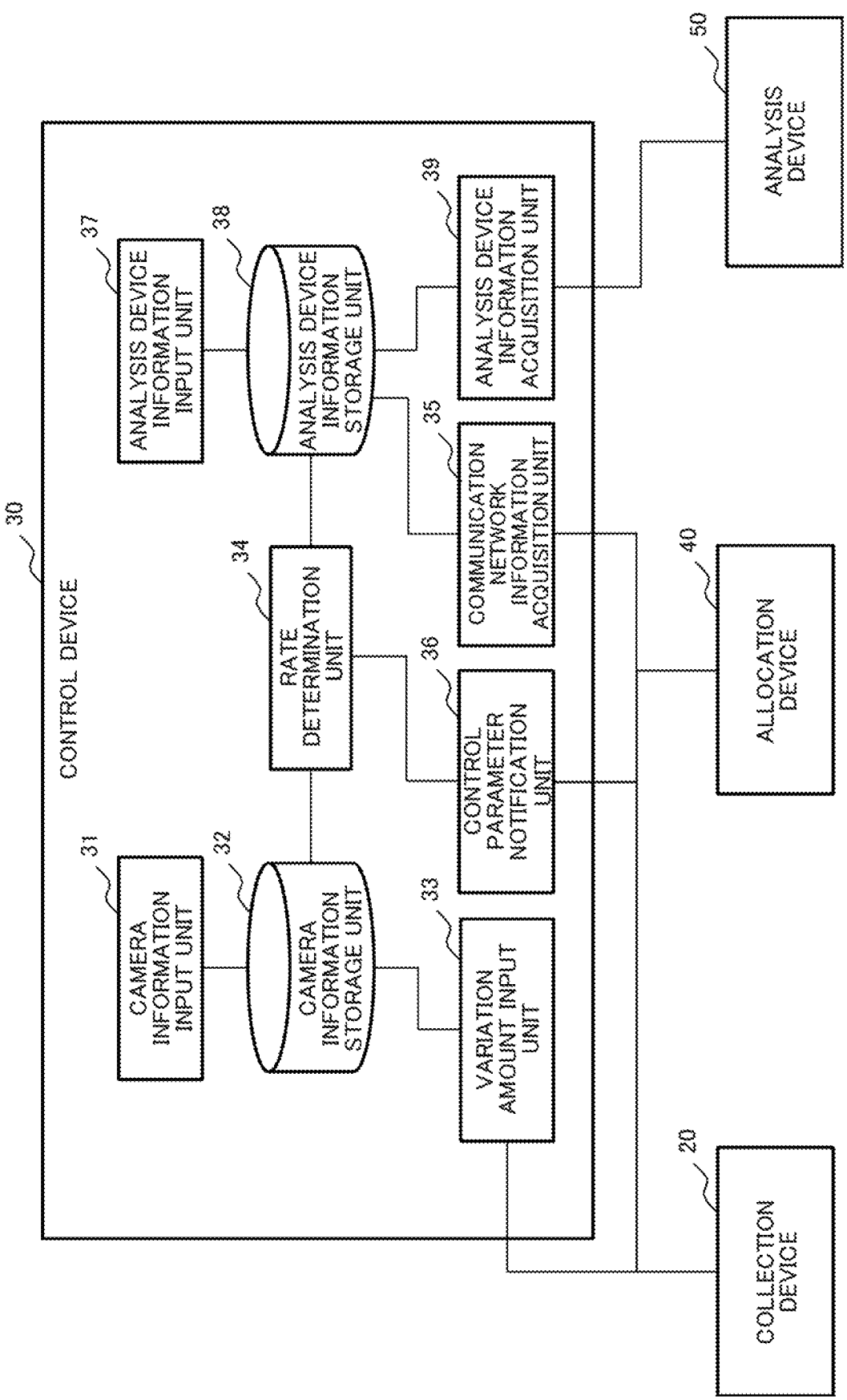
FIG. 3 is a block diagram illustrating a configuration example of a control device 30.

FIG. 3 is a block diagram illustrating a configuration example of the control device 30. The control device 30 includes a camera information input unit 31, a camera information storage unit 32, a variation amount input unit 33, a rate determination unit 34, a communication network information acquisition unit 35, a control parameter notification unit 36, an analysis device information input unit 37, an analysis device information storage unit 38, and an analysis device information acquisition unit 39.

The variation amount input unit 33 acquires the variation amount $\omega_{ci}$ among frames of the video from each camera 10 calculated by the variation amount calculation unit 24 in the collection device 20, and stores the acquired information in the camera information storage unit 32. The camera information input unit 31 acquires, from an administrator, an Internet Protocol (IP) address, the identification number i, and a maximum frame rate $MaxRate_i$ of the installed camera 10, and stores the acquired information in the camera information storage unit 32. Note that i is any value out of one or more, and equal to or less than N (natural number) being the number of the cameras 10.

The communication network information acquisition unit 35 receives, from the collection device 20, the communication band $B_{AD}$ of the communication-network-A 81 observed by the communication-network-A observation unit 23, further receives, from the allocation device 40, a communication band $B_{DPj}$ (j is an identification number of each analysis device 50) of the communication-network-B 82 observed by a communication-network-B observation unit 41, and stores the received communication bands in the analysis device information storage unit 38. Note that j is any value out of one or more, and equal to or less than M (natural number) being the number of the analysis devices 50. The communication band of the communication-network-B 82 may be different for each of the analysis devices 50.

The analysis device information acquisition unit 39 acquires, from each analysis device 50, an analysis processing speed $P_j$ periodically or in response to an instruction from the rate determination unit 34, and stores the acquired information in the analysis device information storage unit 38. The analysis device information input unit 37 acquires, from an administrator, an IP address of each analysis device 50, a set $T_j$ of the identification numbers of the cameras 10 set as an analysis target, a minimum required rate $MinRate_j$, and a priority $\omega_{aj}$ of the analysis device 50, and stores the acquired information in the analysis device information storage unit 38. Herein, the minimum required rate is the minimum number of frame rates to be required for the analysis device 50 to perform analysis.

Herein, the set $T_j$ of the identification numbers of the cameras 10 set as the analysis target is a set of the identification numbers of the cameras 10 set as the analysis target by the j-th analysis device 50. Not all analysis devices 50 analyze the videos from all the cameras 10. In other words, the analysis device 50 may perform only an analysis of a video from a designated part of the cameras 10. For example, the analysis device 50 that performs an analysis of age/sex of a customer may analyze only the video from the camera 10 near an entrance of a store, and the analysis device 50 that performs an analysis of a suspicious person may analyze only the video from the camera 10 on a sales floor in the store. In this case, a combination of i and j to be calculated for frame rate is limited to a part. The set $T_j$ of the identification numbers of the cameras 10 set as the analysis target designates a valid combination of i and j.

The rate determination unit 34 calculates a frame rate of the video from each camera 10 to be transmitted by the collection device 20 and the allocation device 40, based on the pieces of information stored in the camera information storage unit 32 and the analysis device information storage unit 38, and notifies the collection device 20 and the allocation device 40 of the calculated value via the control parameter notification unit 36.

Figure 4:
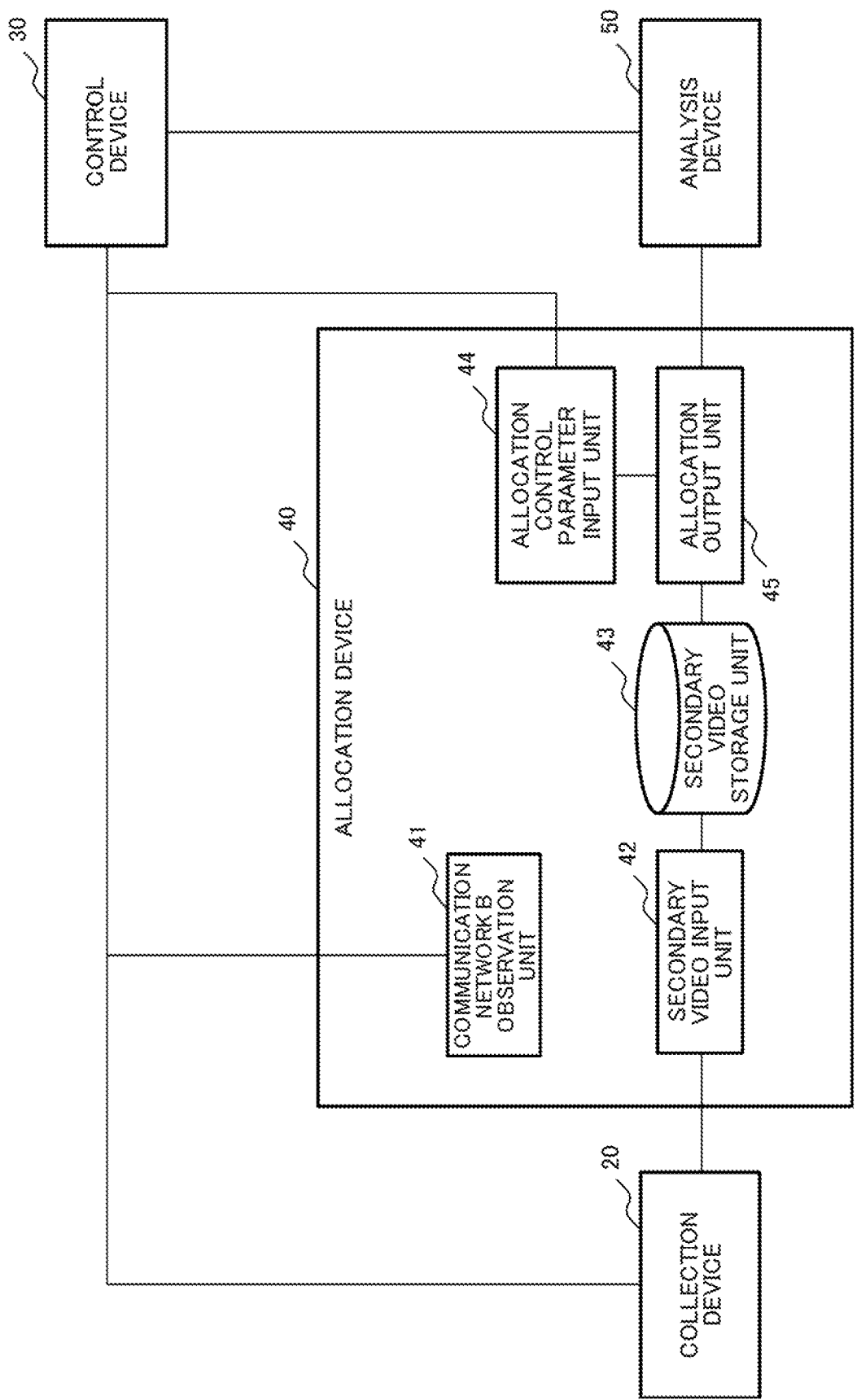
FIG. 4 is a block diagram illustrating a configuration example of an allocation device 40.

FIG. 4 is a block diagram illustrating a configuration example of the allocation device 40. The allocation device 40 includes the communication-network-B observation unit 41, a secondary video input unit 42, a secondary video storage unit 43, an allocation control parameter input unit 44, and an allocation output unit 45.

The communication-network-B observation unit 41 measures the communication band $B_{DPj}$ of the communication-network-B 82. The secondary video input unit 42 receives the video data transmitted from the collection device 20, and stores the received video data in the secondary video storage unit 43.

The allocation control parameter input unit 44 receives, from the control device 30, the control parameter including the frame rate and notifies the allocation output unit 45. The allocation output unit 45 transmits, at the frame rate notified by the control parameter, the video stored in the secondary video storage unit 43 to a designated analysis device 50 via the communication-network-B 82. At this time, similarly to the collection output unit 26 in the collection device 20, the allocation output unit 45 outputs the video with or without excluding some frames, and thus transmits the video at the notified frame rate. Specifically, the allocation output unit 45 does not transmit a part of the frames when the notified frame rate is smaller than the received frame rate.

The communication-network-B observation unit 41 may be activated periodically and transmit data to the control device 30, or may transmit data in response to an instruction from the control device 30.

FIG. 5 is an example of a data structure stored in the camera information storage unit 32. The camera information storage unit 32 stores, for each of N number of the cameras 10, the IP address to access via the communication network, the identification number i, the maximum frame rate MaxRate$_i$ of the video to be captured, and the latest variation amount $\omega_{ci}$.

FIG. 6 is an example of a data structure stored in the analysis device information storage unit 38. The analysis device information storage unit 38 stores, for each of M number of the analysis devices 50, the IP address to access via the communication network, the identification number j, the analysis processing speed P$_j$, the communication band B$_{DPj}$ of the communication-network-B 82, the set T$_j$ of the identification numbers of the cameras 10 set as the analysis target, the minimum required rate MinRate$_j$, and the priority $\omega_{aj}$. Further, the analysis device information storage unit 38 stores the communication band B$_{AD}$ of the communication-network-A 81.

Figure 7:
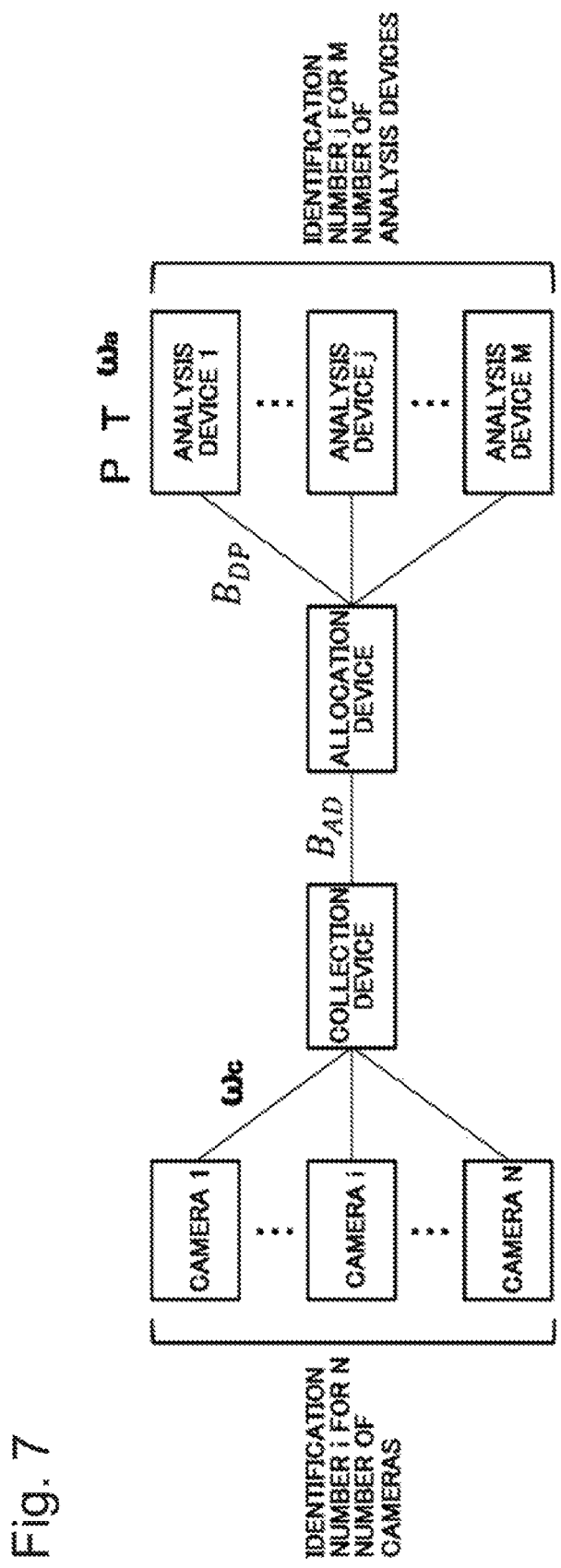
FIG. 7 is a diagram illustrating a relationship between main data stored in the camera information storage unit 32 and in the analysis device information storage unit 38, and the configuration of the video distribution system 90.

FIG. 7 is a diagram illustrating a relationship between main data stored in the camera information storage unit 32 and in the analysis device information storage unit 38, and the configuration of the video distribution system 90.

Figure 8:
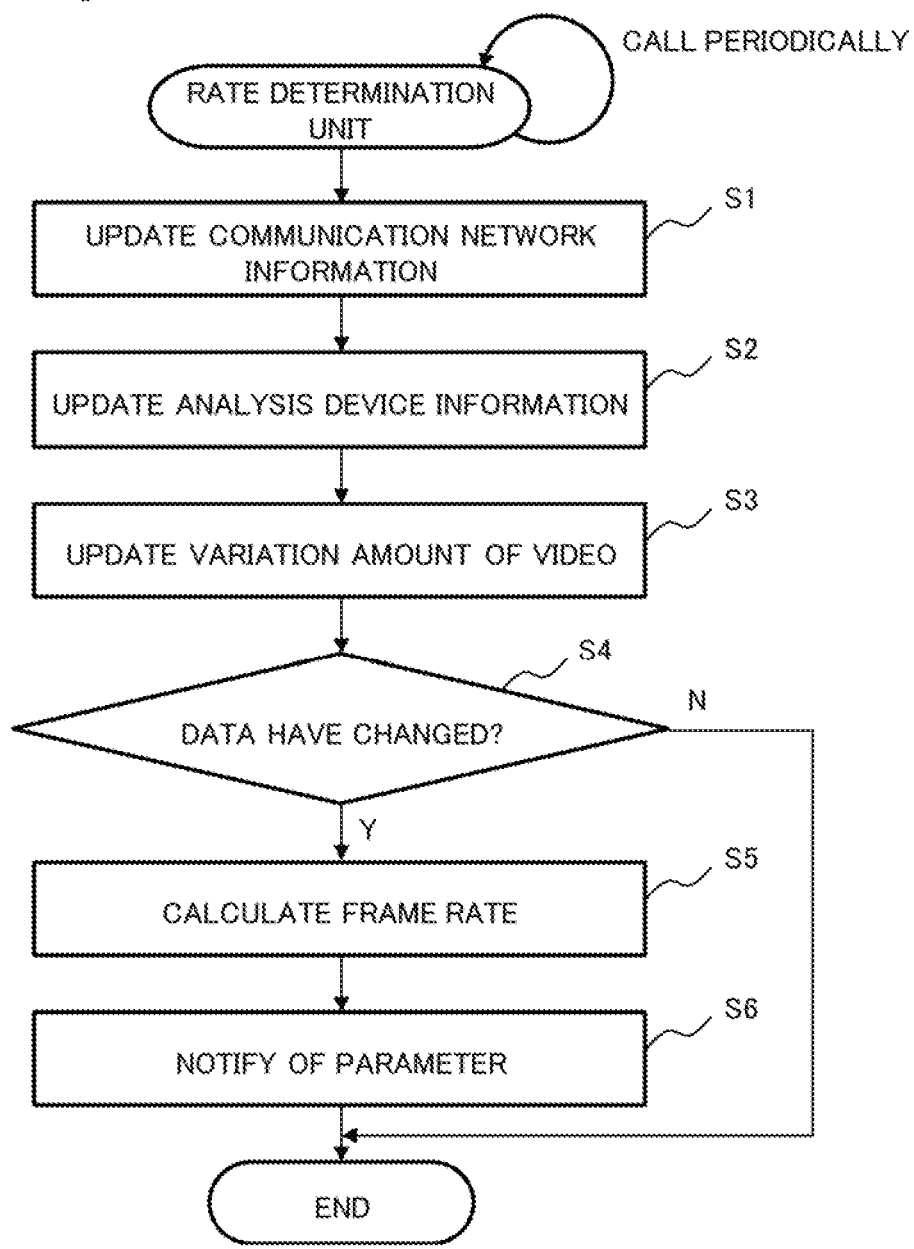
FIG. 8 is a flowchart of an operation of a rate determination unit 34 in the control device 30.

FIG. 8 is a flowchart of an operation of the rate determination unit 34 in the control device 30. The rate determination unit 34 is, for example, activated periodically. When activated, the rate determination unit 34 first updates the pieces of data in the camera information storage unit 32 and the analysis device information storage unit 38.

The rate determination unit 34 requests the communication network information acquisition unit 35 to update communication network information including the communication band of the communication-network-A 81 and the communication band of the communication-network-B 82 stored in the analysis device information storage unit 38 (S1), and requests the analysis device information acquisition unit 39 to update analysis device information including the speed of analysis processing by each analysis device 50 (S2). Then, the rate determination unit 34 requests the variation amount input unit 33 to acquire the latest variation amount of the video from each camera 10 and update the camera information storage unit 32 (S3).

With respect to other data stored in the camera information storage unit 32 and the analysis device information storage unit 38, for example, an administrator inputs and sets the other data as appropriate from the analysis device information input unit 37 and the camera information input unit 31, when the video distribution system 90 starts or the like.

Then, the rate determination unit 34 determines whether each of the updated data has changed by equal to or more than a predetermined ratio (S4). When there are data that has changed by equal to or more than the predetermined ratio (Y in S4), the rate determination unit 34 calculates a first frame rate $x_{ij}$ when the video from each camera 10 is transmitted from the collection device 20 to the allocation device 40, and a second frame rate $y_{ij}$ when the video is transmitted from the allocation device 40 to each analysis device 50 (S5).

Lastly, the rate determination unit 34 notifies, as the control parameter, the collection device 20 of the first frame rate, and the allocation device 40 of the second frame rate (S6). As a result, the collection output unit 26 in the collection device 20 transmits the video from the i-th camera 10 to the allocation device 40 at the first frame rate $x_i$. The allocation output unit 45 in the allocation device 40 transmits the video from the i-th camera 10 to the j-th analysis device 50 at the second frame rate $y_{ij}$.

<Rate Determination Method>

The rate determination unit 34 in the control device 30 calculates the first frame rate $x_i$, and the second frame rate $y_{ij}$, based on the pieces of data stored in the camera information storage unit 32 and the analysis device information storage unit 38. At this time, the rate determination unit 34 calculates the frame rates by solving an optimization problem formulated as follows.

Expression 2 represents an objective function that is maximized in the optimization problem. Expression 2 indicates a case where there is no limitation with respect to the combination of i and j. When the analysis device 50 analyzes only a video from a part of the cameras 10, the rate determination unit 34 calculates a sum total of the two terms in Expression 2 by limiting the range of i for each j to "the set T$_j$ of the identification numbers of the cameras 10 set as a target" of the j-th analysis device 50.

$$\max \sum_N \omega_{ci} x_i + \sum_N \sum_M \omega_{aj} y_{ij} \qquad \text{[Expression 2]}$$

A constraint inequality for the optimization problem is as follows. Inequality 3 represents a constraint between the first frame rate of each camera 10 for transmitting from the collection device 20 to the allocation device 40, and the second frame rate of each camera 10 for transmitting from the allocation device 40 to each analysis device 50. In other words, Inequality 3 is a constraint inequality for adjusting in such a way that, in each camera 10, the second frame rate does not exceed the first frame rate.

$$x_i \geq y_{ij} (i \in N, j \in M) \qquad \text{[Inequality 3]}$$

Inequality 4 is a constraint inequality that ensures that the frame rate of each camera 10 for transmitting from the collection device 20 to the analysis device 50 does not exceed the maximum frame rate MaxRate$_i$ of the camera 10.

$$x_i \leq \text{MaxRate}_i (i \in N) \qquad \text{[Inequality 4]}$$

Inequality 5 is a constraint inequality related to the communication band B$_{AD}$ of the communication-network-A 81, and ensures that a sum total of the first frame rate of each camera 10 for transmitting from the collection device 20 to the allocation device 40 does not exceed the communication band of the communication-network-A 81.

$$\sum_N x_i \le B_{AD} \qquad \text{[Inequality 5]}$$

Inequality 6 is a constraint inequality related to an upper limit value of the second frame rate for transmitting from the allocation device 40 to each analysis device 50, and ensures that a sum total of the second frame rate does not exceed the communication band $B_{DPj}$ of the communication-network-B 82 and the speed of analysis processing by the analysis device 50.

$$\sum_i y_{ij} \le \min(B_{DPj}, P_j) \quad (i \in N, \ j \in M) \qquad \text{[Inequality 6]}$$

Inequality 7 is a constraint inequality related to a lower limit value of the second frame rate for transmitting from the allocation device 40 to each analysis device 50, and controls in such a way that a video having a frame rate equal to or higher than the minimum request rate $MinRate_j$ acquired from the analysis device information storage unit 38 reaches.

$$y_{ij} \ge MinRate_j (i \in N, j \in M) \qquad \text{[Inequality 7]}$$

The above-described optimization problem is a linear programming problem, and the rate determination unit 34 may determine the frame rate by using a general linear programming solver, for example, GNU Linear Programming Kit (GLPK) (registered trademark) or CPLEX (registered trademark). The rate determination unit 34 may also determine the frame rate by using the simplex algorithm.

Operation Example

Figure 9:
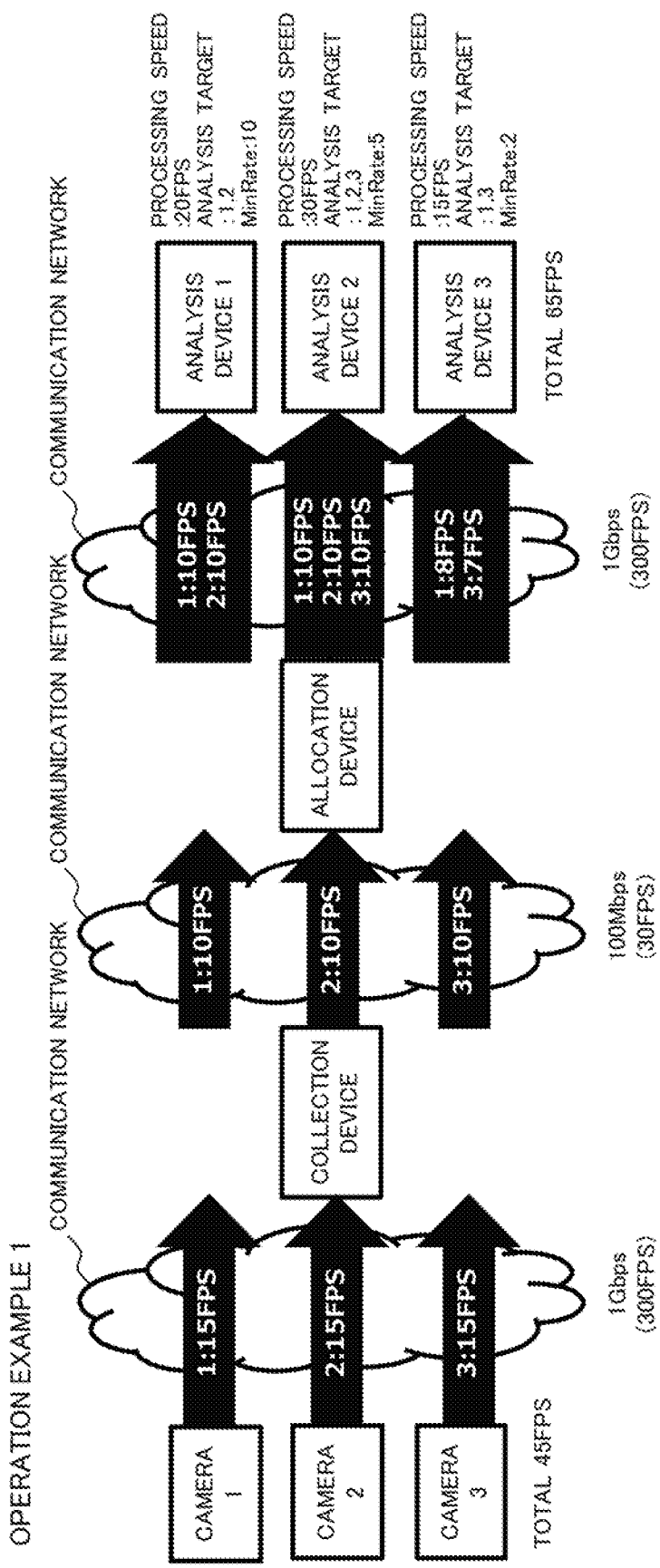
FIG. 9 is a diagram illustrating an operation example of a rate determination method (part 1).
Figure 10:
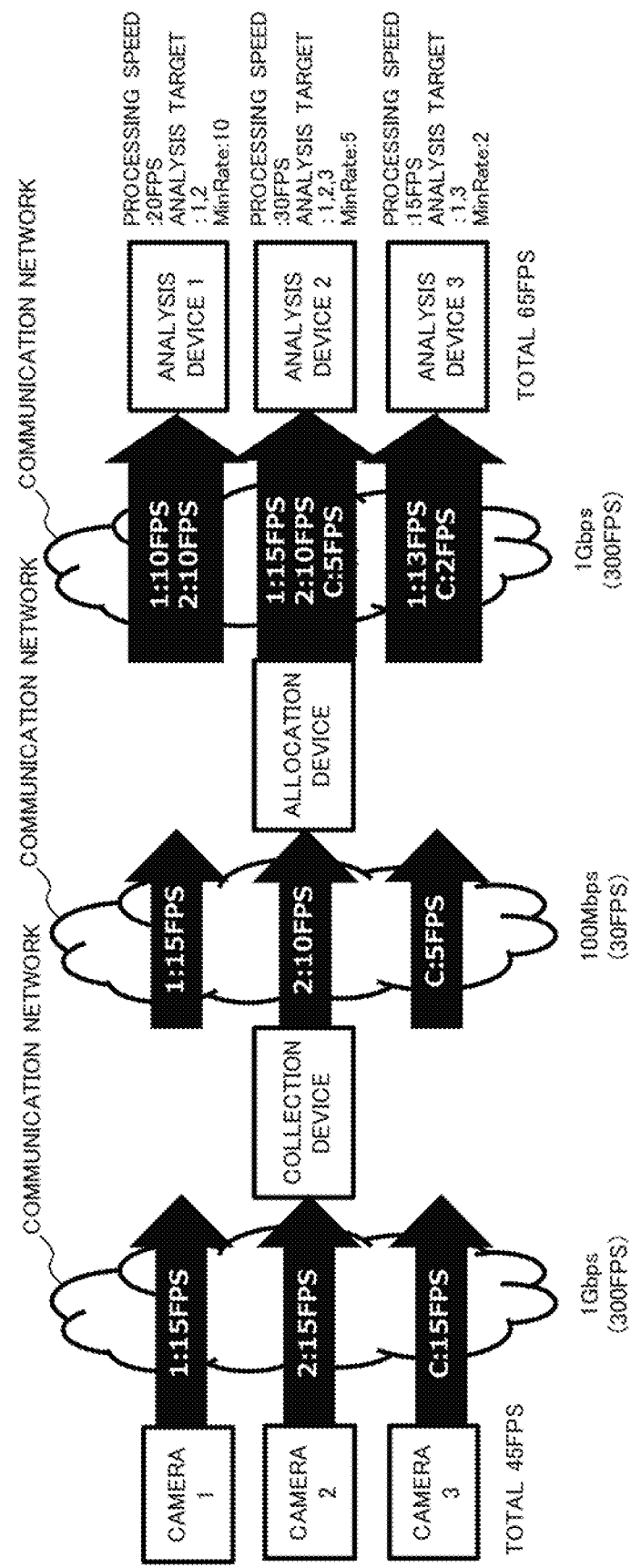
FIG. 10 is a diagram illustrating an operation example of the rate determination method (part 2).

FIGS. 9 and 10 are diagrams illustrating an operation example of the rate determination method. In these figures, for example, it is assumed that a first camera 10 is installed near an entrance of a facility, a second camera 10 is installed on a sales floor, and a third camera 10 is installed in front of a toilet individually. It is assumed that a first analysis device 50 performs an age/sex analysis, a second analysis device 50 performs person tracking, and a third analysis device 50 performs a suspicious person analysis individually. Further, it is assumed that the priority of each analysis device 50 is the same.

FIG. 9 is an operation explanatory diagram when the variation amount among frames of the video from each camera 10 is equal, specifically, when approximately the same number of persons exist within the capturing range of each camera. In this case, the rate determination unit 34 determines the frame rates in such a way that the videos from the cameras 10 are evenly transmitted to each analysis device 50 in consideration of a plurality of resource constraints.

FIG. 10 is an operation explanatory diagram in a case where the variation amount $\omega_{ci}$ among frames of the video from each camera 10 is $\omega_{c1} > \omega_{c2} >> \omega_{c3}$, specifically, when there are few persons near the toilet. In this case, the rate determination unit 34 preferentially transmits the video from the camera 10 having a large variation amount to each analysis device 50 while considering the plurality of resource constraints.

<Configuration of Each Unit>

The camera information input unit 31, the variation amount input unit 33, the rate determination unit 34, the communication network information acquisition unit 35, the control parameter notification unit 36, the analysis device information input unit 37, and the analysis device information acquisition unit 39 in the control device 30 are configured by a logical circuit, or a dedicated processor and firmware. The camera information storage unit 32 and the analysis device information storage unit 38 are storage devices such as a semiconductor storage device, a hard disk drive (HDD), or a solid state drive (SDD).

Figure 11:
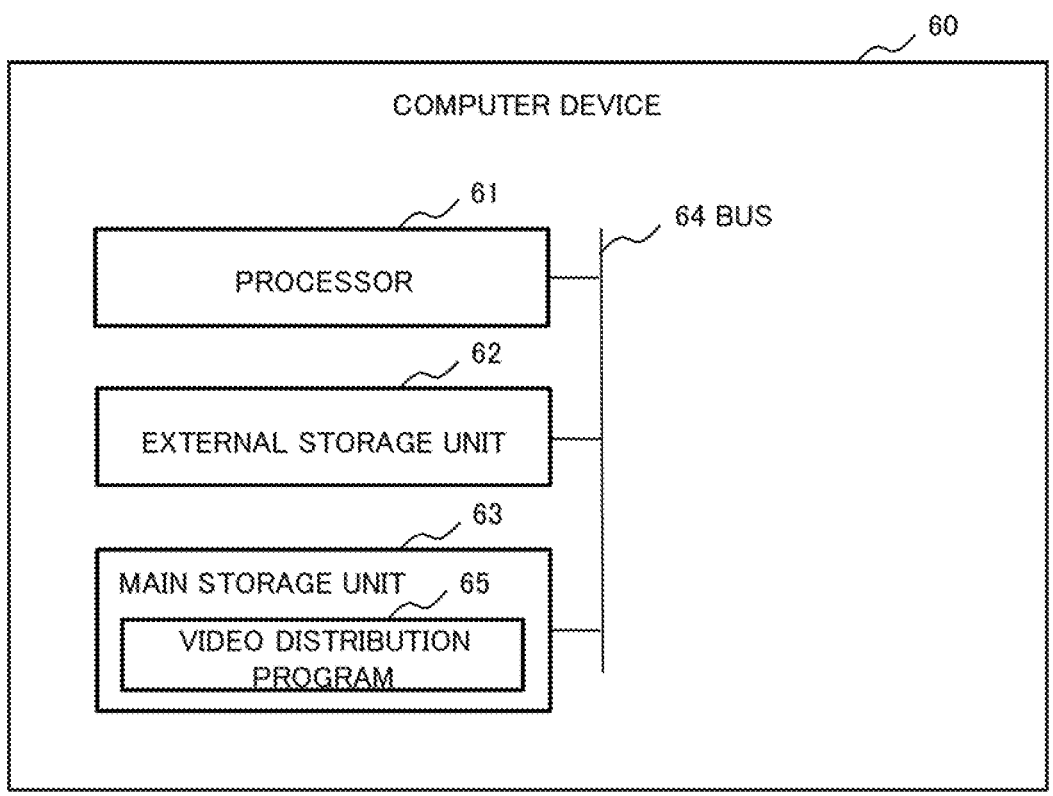
FIG. 11 is a configuration diagram of a computer device 60.

The control device 30 may be configured by a computer device 60. FIG. 11 is a configuration diagram of the computer device 60. The computer device 60 includes a processor 61, a main storage unit 63, and an external storage unit 62 that are interconnected with a bus 64.

The processor 61 reads and writes, via the bus 64, data from and to the main storage unit 63 and the external storage unit 62.

The processor 61 executes a video distribution program 65 stored in the main storage unit 63. The video distribution program 65 may be initially stored in the external storage unit 62, and the processor 61 may load, when an initial setting of the computer device 60 is performed, the video distribution program 65 from the external storage unit 62 into the main storage unit 63.

Herein, the main storage unit 63 is a semiconductor memory. The external storage unit 62 is a storage unit such as an HDD or an SDD.

The processor 61 in the computer device 60 functions, by executing the video distribution program 65, as the camera information input unit 31, the variation amount input unit 33, the rate determination unit 34, the communication network information acquisition unit 35, the control parameter notification unit 36, the analysis device information input unit 37, and the analysis device information acquisition unit 39. In other words, the processor 61 executes, by executing the video distribution program 65, processing performed by the camera information input unit 31, the variation amount input unit 33, the rate determination unit 34, the communication network information acquisition unit 35, the control parameter notification unit 36, the analysis device information input unit 37, and the analysis device information acquisition unit 39.

The main storage unit 63 or the external storage unit 62 is used as the camera information storage unit 32 and the analysis device information storage unit 38.

Similarly, the primary video input unit 21, the communication-network-A observation unit 23, the variation amount calculation unit 24, the collection control parameter input unit 25, and the collection output unit 26 in the collection device 20 are configured by a logical circuit, or a dedicated processor and firmware. The primary video storage unit 22 is a storage device such as a semiconductor storage device, an HDD, or an SDD. Similarly to the control device 30, the collection device 20 may also be configured by the computer device 60.

Similarly, the communication-network-B observation unit 41, the secondary video input unit 42, the allocation control parameter input unit 44, and the allocation output unit 45 in the allocation device 40 are configured by a logical circuit, or a dedicated processor and a firmware. The secondary video storage unit 43 is a storage device such as a semiconductor storage device, an HDD, or an SDD. Similarly to the control device 30, the allocation device 40 may also be configured by the computer device 60.

Modification Example

The priorities of the analysis devices 50 may be the same. In this case, in Expression 2, the priority may be regarded as 1. Further, when the band of the communication-network-B 82 is very large compared to the amount of data of the video from the camera 10, or when the communication-network-B 82 does not exist and the analysis device 50 is directly connected by a cable, the communication band in Inequality 6 does not need to exist and only the speed of analysis processing by the analysis device 50 may be considered in Inequality 6.

Advantageous Effect

The video distribution system 90 is able to distribute, to each of the analysis devices 50, a video having an appropriate frame rate, depending on a variation amount among frames of the video and a speed of analysis processing by the analysis device 50. A reason for this is that 1) the frame rate of the video to be received is within a range of the speed of analysis processing by the analysis device 50, and 2) the rate determination unit 34 determines the frame rate in such a way that a value of an objective function, which increases with an increase of a sum total of a product of a variation amount among frames of the transmitted video and the frame rate, becomes maximum.

Further, the video distribution system 90 distributes a video having an appropriate frame rate in such a way that a transmission amount falls within a limited range of the communication bands of the communication-network-A 81 and the communication-network-B 82 to be used for transmitting the video. A reason for this is that the rate determination unit 34 determines the frame rate in such a way as to maximize the value of the above-described objective function in consideration of the band limits of the communication-network-A 81 and the communication-network-B.

As a result, the video distribution system 90 is able to efficiently transmit the videos from a plurality of the cameras 10 to a plurality of the analysis devices 50 in consideration of the resource constraints of the analysis device 50, the communication-network-A 81, and the like, and quality of data.

Further, the video distribution system 90 is able to transmit a video having a high frame rate to the analysis device 50 having a high priority in consideration of the priority of the analysis device 50. A reason for this is that the rate determination unit 34 determines the frame rate in such a way as to maximize the objective function such as Expression 2, which is easy to respond to a reception amount of the analysis device 50 having a high priority.

Second Example Embodiment

Figure 12:
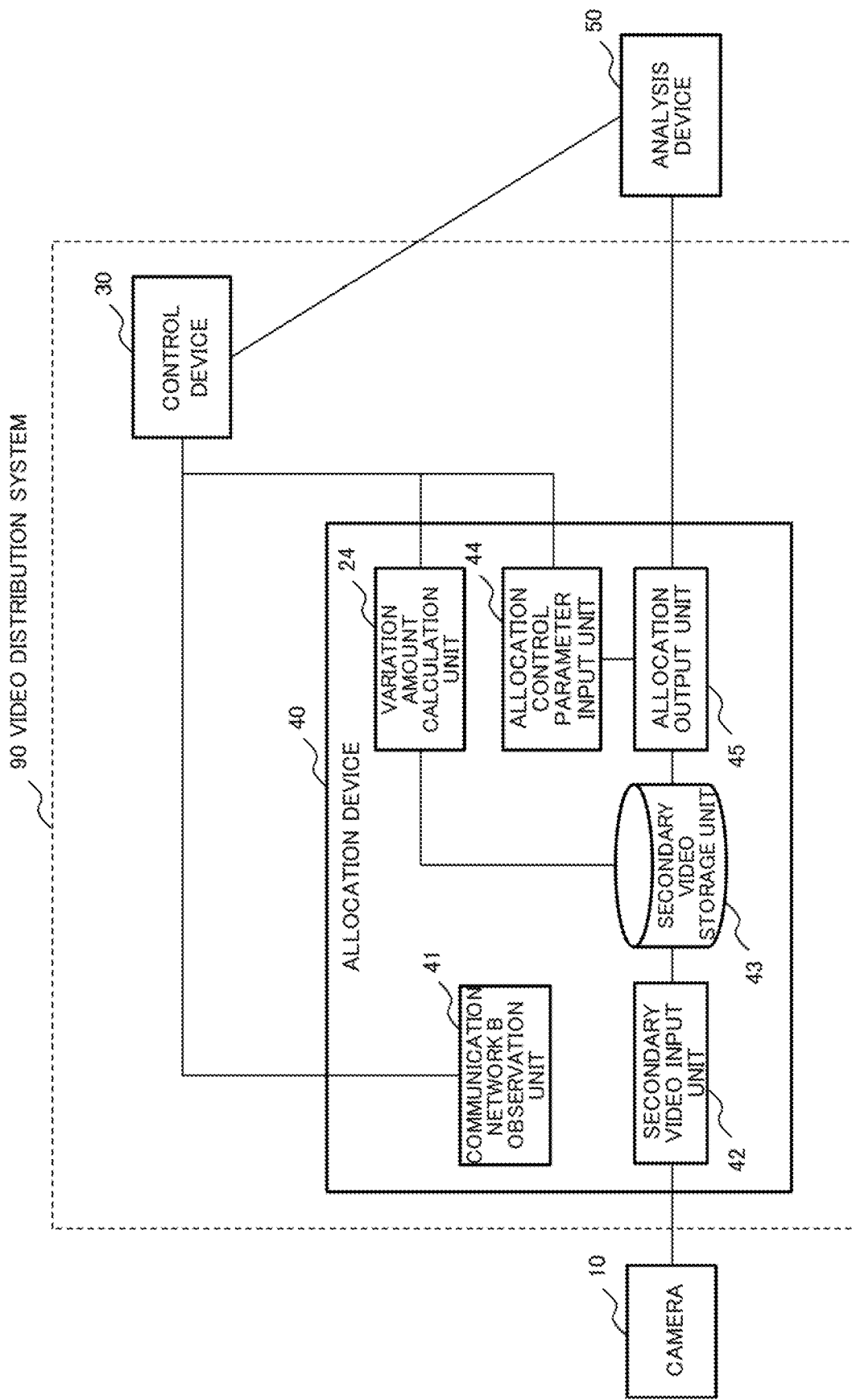
FIG. 12 is a diagram illustrating a configuration of an allocation device 40 according to a second example embodiment.

In a video distribution system 90 according to the present example embodiment, the collection device 20 and the allocation device 40 become one device, and a communication via the communication-network-A 81 does not exist. FIG. 12 is a diagram illustrating a configuration of an allocation device 40 according to the present example embodiment.

The allocation device 40 is connected to a plurality of cameras 10, and a video from each camera 10 is stored in a secondary video storage unit 43 via a secondary video input unit 42. The allocation device 40 according to the present example embodiment includes a variation amount calculation unit 24. According to the first example embodiment, the collection device 20 includes the variation amount calculation unit 24. The variation amount calculation unit 24 calculates a variation amount from the video from each camera 10 stored in the secondary video storage unit 43, and other points are the same as those of the first example embodiment.

A variation amount input unit 33 in a control device 30 acquires, from the variation amount calculation unit 24 in the allocation device 40, the variation amount among frames of the video. A communication network information acquisition unit 35 acquires, from a communication-network-B observation unit 41 in the allocation device 40, a communication band $B_{DPj}$ of a communication-network-B 82.

According to the present example embodiment, a rate determination unit 34 uses the following Expression 8 as an objective function, and calculates a second frame rate $y_{ij}$ in such a way as to maximize the objective function under constraint inequalities of Inequality 9, Inequality 6, and Inequality 7. Herein, Expression 8 and Inequality 9 are as follows, and Inequality 6 and Inequality 7 are the same as those of the first example embodiment. Expression 8 indicates a case where there is no limitation with respect to a combination of i and j. When the analysis device 50 analyzes only the videos from a part of the cameras 10, the rate determination unit 34 calculates the frame rate by limiting the combination of i and j, similarly to the first example embodiment.

$$\max \sum_N \sum_M \omega_i^c \omega_j^a y_{ij} \qquad \text{[Expression 8]}$$

$$\sum_j y_{ij} \leq MaxRate_i \quad (i \in N, j \in M) \qquad \text{[Inequality 9]}$$

Needless to say, according to the present example embodiment, an analysis device information storage unit 38 does not store the communication-network-A 81 band $B_{AD}$. Other points of the video distribution system 90 according to the present example embodiment are the same as those of the first example embodiment.

According to the present example embodiment, similar modification to the modification example according to the first example embodiment is possible. Further, according to the present example embodiment, the control device 30 and the allocation device 40 may be implemented as one device. For example, the control device 30 may additionally include all components of the allocation device 40. Further, one computer device 60 may execute a video distribution program 65 and function all components of the control device 30 and the allocation device 40.

With a simple configuration without the collection device 20 and the communication-network-A 81, the video distribution system 90 according to the present example embodiment is able to distribute, to each of the analysis devices 50, a video having an appropriate frame rate, depending on a variation amount among frames of the video and a speed of analysis processing by the analysis device 50. A reason for this is that 1) the frame rate of the video to be received is within a range of the speed of analysis processing by the analysis device 50, and 2) the rate determination unit 34 determines the frame rate in such a way that a value of an objective function, which increases with an increase of a sum total of a product of a variation amount among frames of the transmitted video and the frame rate, becomes maximum.

Further, the video distribution system 90 distributes a video having an appropriate frame rate in such a way that a transmission amount falls within a limited range of the communication band of the communication-network-B 82 to be used for transmitting the video. A reason for this is that the rate determination unit 34 determines the frame rate in such a way as to maximize the value of the above-described objective function in consideration of the band limit of the communication-network-B 82.

As a result, the video distribution system 90 is able to efficiently transmit the videos from a plurality of the cameras to a plurality of the analysis devices 50 in consideration of the resource constraints of the analysis device 50 and the communication network, and quality of data.

Further, the video distribution system 90 is able to transmit a video having a higher frame rate to the analysis device 50 having a high priority in consideration of the priority of the analysis device 50. A reason for this is that the rate determination unit 34 determines the frame rate in such a way as to maximize the objective function such as Expression 8, which is easy to respond to a reception amount of the analysis device 50 having a high priority.

Third Example Embodiment

Figure 13:
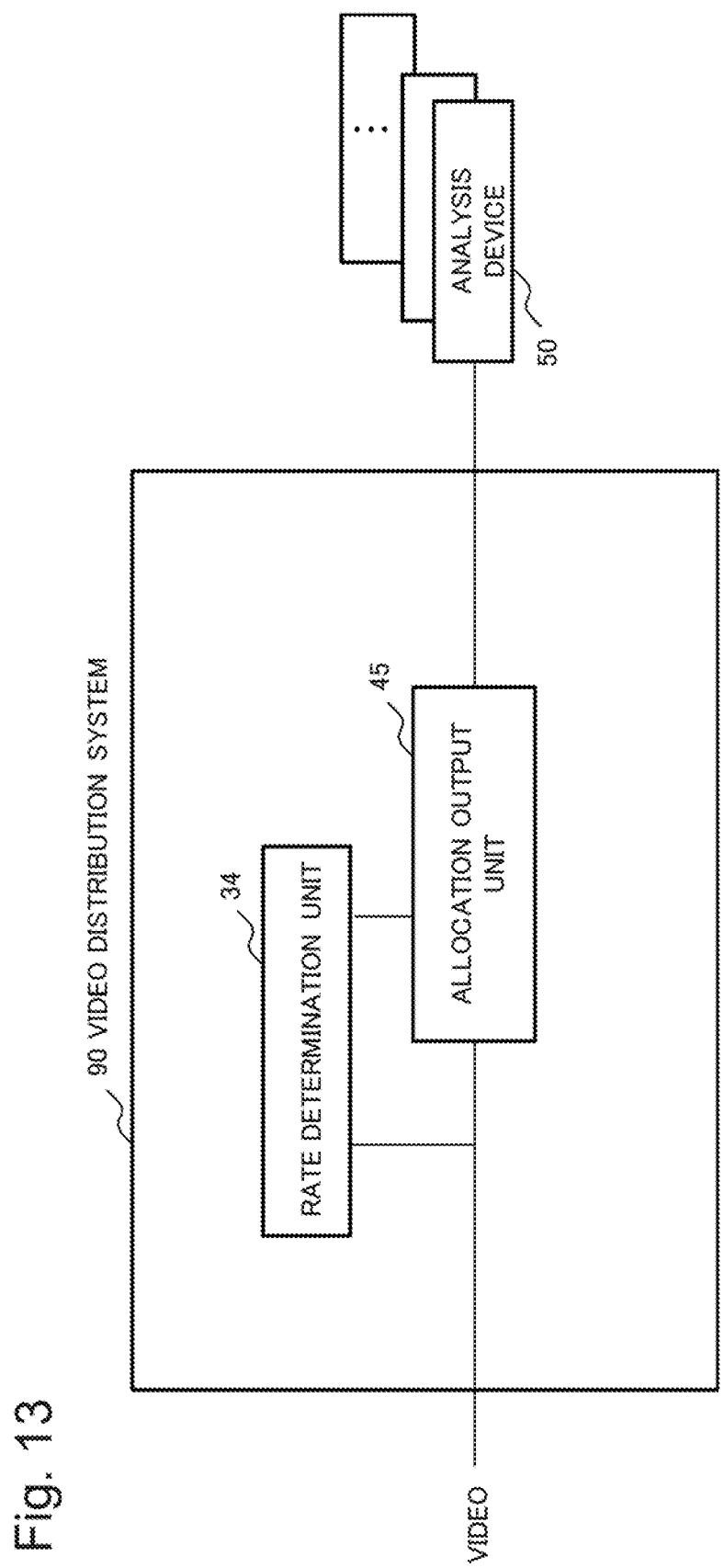
FIG. 13 is a diagram illustrating a configuration of an allocation system 90 according to a third example embodiment.

FIG. 13 is a diagram illustrating a configuration of a video distribution system 90 according to a third example embodiment.

The video distribution system 90 includes an allocation output unit 45 and a rate determination unit 34. The allocation output unit 45 transmits, at a notified frame rate, videos acquired from a plurality of cameras 10 to a plurality of analysis devices 50 that process the videos. The rate determination unit 34 calculates a frame rate in such a way that a value an objective function becomes maximum, under a condition that a sum total of the frame rates of the video received by the analysis device 50 does not exceed a speed of analysis processing by the analysis device 50, and notifies the allocation output unit 45 of the calculated frame rate. Herein, the objective function is a function that has a property of increasing with an increase of a sum total of a product of a variation amount among frames of a transmitted video and the transmitted frame rate.

The video distribution system 90 according to the present example embodiment is able to distribute, to each of the analysis devices 50, a video having an appropriate frame rate, depending on a variation amount among frames of the video and a speed of analysis processing by the analysis device 50. A reason for this is that the frame rate of the video to be received is within a range of the speed of analysis processing by the analysis device 50, and the rate determination unit 34 determines the frame rate in such a way that a value of an objective function, which increases with an increase of a sum total of a product of a variation amount among frames of the transmitted video and the frame rate, becomes maximum.

While the present disclosure has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-204459, filed on Oct. 23, 2017, the disclosure of which is incorporated herein in its entirety by reference.

REFERENCE SIGNS LIST

10 Camera
20 Collection device
21 Primary video input unit
22 Primary video storage unit
23 Communication-network-A observation unit
24 Variation amount calculation unit
25 Collection control parameter input unit
26 Collection output unit
30 Control device
31 Camera information input unit
32 Camera information storage unit
33 Variation amount input unit
34 Rate determination unit
35 Communication network information acquisition unit
36 Control parameter notification unit
37 Analysis device information input unit
38 Analysis device information storage unit
39 Analysis device information acquisition unit
40 Allocation device
41 Communication-network-B observation unit
42 Secondary video input unit
43 Secondary video storage unit
44 Allocation control parameter input unit
45 Allocation output unit
50 Analysis device
60 Computer device
61 Processor
62 External storage unit
63 Main storage unit
64 Bus
65 Video distribution program
81 Communication-network-A
82 Communication-network-B
90 Video distribution system

What is claimed is:

1. A video distribution system comprising:
at least one memory storing a computer program: and
at least one processor configured to execute the computer program to:
transmit, at a frame rate being notified, videos to a plurality of analysis devices that process the videos, the videos being videos that are acquired from a plurality of cameras and stored in storage;
calculate the frame rate in such a way that a value of an objective function, which increases with an increase of a sum total of products of variation amounts among frames of the videos being transmitted and the frame rate being transmitted, becomes maximum, under a first condition that a sum total of the frame rates of the videos received by the analysis devices does not exceed a speed of analysis processing by the analysis devices;
calculate the variation amount of the videos acquired from the cameras;
acquire the speed of the analysis processing by the analysis devices; and
output the videos to the analysis devices with or without excluding some frames, the videos having the frame rate being calculated.

2. The video distribution system according to claim 1, further comprising an allocation device and a control device, wherein
the allocation device includes
the memory and the processor, wherein the processor is configured to execute the computer program to output the video to the analysis device with or without excluding some frames, the video having the frame rate being calculated, and the control device includes
the memory and the processor, wherein the processor is configured to execute the computer program to:
acquire the speed of the analysis processing by the analysis device,
calculate the frame rate in such a way that the value of the objective function, which is a sum total of products of the variation amounts for each of the videos and a frame rate at which the video is transmitted to each of the analysis devices, becomes maximum, under the first condition, and
notify the allocation device of the frame rate being calculated.

3. The video distribution system according to claim 1, further comprising a collection device, an allocation device, and a control device, wherein the collection device includes
the memory and the processor, wherein the processor is configured to execute the computer program to
output the video to the allocation device with or without excluding some frames via a first communication network, the video having the frame rate being notified, and
acquire a communication band of the first communication network,
the allocation device includes
the memory and the processor, wherein the processor is configured to execute the computer program to
output the video received from the collection device to the analysis device with or without excluding some frames, the video having the frame rate being notified, and
the control device includes
the memory and the processor, wherein the processor is configured to execute the computer program to
acquire the speed of the analysis processing by the analysis device,
calculate a first and a second of the frame rates in such a way that the value of the objective function, which is a first sum total acquired by adding a sum a second sum total and a third sum total, the second sum total being a sum total of the products of the variation amounts for each of the videos and the first frame rate of the video transmitted by the collection device, the third sum total being a sum total of the second frame rate at which each of the videos is transmitted to each of the analysis devices, becomes maximum, under the first condition and a second condition in which a sum total of the first frame rates does not exceed a communication band of the first communication network,
notify the collection device of the first frame rate, and notify the allocation device of the second frame rate.

4. The video distribution system according to claim 3, wherein the processor is configured to execute the computer program to:
acquire a priority for each of the analysis devices, and
calculate under the first condition and the second condition, the first frame rate and the second frame rate in such a way that the value of the objective function, which is-a-sum a fourth sum total acquired by adding the second sum total and a fifth sum total, the second sum total being a sum total of the products of the variation amounts for each of the videos and the first frame rate of the video transmitted by the collection device, the fifth sum total being a sum total of a product of the priority and the second frame rate at which each of the videos is transmitted to each of the analysis devices.

5. The video distribution system according to claim 3, wherein
the processor in the allocation device is configured to execute the computer program to:
output the videos to the analysis devices via a second communication network; and
acquire a communication band of the second communication network; and
the processor in the control device is configured to execute the computer program to:
calculate the first frame rate and the second frame rate, under a condition adding a third condition that a sum total of the frame rates at which each of the videos is transmitted to each of the analysis devices does not exceed a communication band of the second communication network.

6. A video distribution method comprising, when videos, acquired from a plurality of cameras and stored in storage, are transmitted to a plurality of analysis devices that process the videos
calculating a frame rate in such a way that a value of an objective function, which increases with an increase of a sum total of products of variation amounts among frames of the videos being transmitted and a frame rate being transmitted, becomes maximum, under a first condition that a sum total of the frame rates of the videos received by the analysis devices does not exceed a speed of analysis processing by the analysis devices;
transmitting the videos at the frame rate being calculated;
calculating the variation amount of the videos acquired from the cameras;
acquiring the speed of the analysis processing by the analysis device; and
outputting the videos to the analysis devices with or without excluding some frames, the videos having the frame rate being calculated.

7. The video distribution method according to claim 6, further comprising
calculating the frame rate in such a way that the value of the objective function, which is a sum total of products of the variation amounts for each of the videos and a frame rate at which the videos are transmitted to each of the analysis devices, becomes maximum under the first condition.

8. A non-transitory computer-readable recording medium storing a video distribution program causing a computer to execute:
processing of transmitting, at a frame rate being notified, videos to a plurality of analysis devices that process the videos, the videos being videos that are acquired from a plurality of cameras and stored in storage; and
processing of calculating and notifying the frame rate in such a way that a value of an objective function, which increases with an increase of a sum total of products of variation amounts among frames of the videos being transmitted and a frame rate being transmitted, becomes maximum, under a first condition that a sum total of the frame rates of the videos received by the analysis devices does not exceed a speed of analysis processing by the analysis devices;
processing of calculating the variation amount of the videos acquired from the cameras;
processing of acquiring the speed of the analysis processing by the analysis devices; and processing of outputting the videos to the analysis devices with or without excluding some frames, the video videos the frame rate being calculated.

* * * * *